Figure 1:
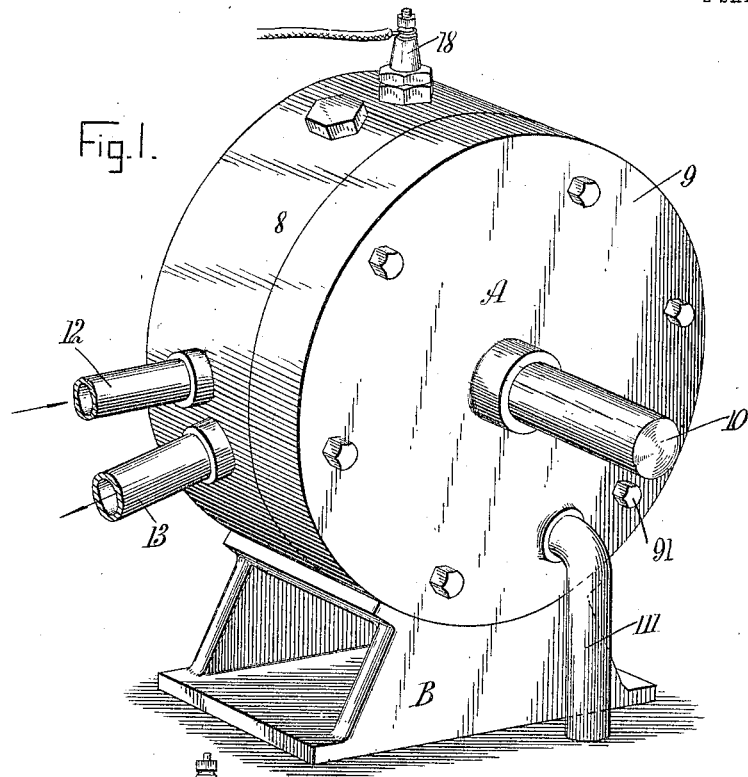

C. B. ZAHN.
ROTARY ENGINE.
APPLICATION FILED FEB. 8, 1912.

1,045,656.

Patented Nov. 26, 1912.

2 SHEETS—SHEET 1.

WITNESSES
G. K. Reichenbach.
H. S. Orton.

INVENTOR
Charles B. Zahn
BY Munn & Co
ATTORNEYS

C. B. ZAHN.
ROTARY ENGINE.
APPLICATION FILED FEB. 8, 1912.

1,045,656.

Patented Nov. 26, 1912.

2 SHEETS—SHEET 2.

WITNESSES
C. H. Reichenbach.
W. S. Orton

INVENTOR
Charles B. Zahn
BY Munn & Co
ATTORNEYS

UNITED STATES PATENT OFFICE.

CHARLES B. ZAHN, OF ROCHESTER, NEW YORK, ASSIGNOR TO ALBERT E. MAY, OF ROCHESTER, NEW YORK.

ROTARY ENGINE.

1,045,656.  Specification of Letters Patent.  Patented Nov. 26, 1912.

Application filed February 8, 1912. Serial No. 676,250.

*To all whom it may concern:*

Be it known that I, CHARLES B. ZAHN, a citizen of the United States, and a resident of Rochester, in the county of Monroe and State of New York, have invented a new and Improved Rotary Engine, of which the following is a full, clear, and exact description.

My invention relates to a rotary engine in which rotary pistons are employed, provided with vanes about their peripheries, the vanes on one piston extending across the periphery of the other piston, and in which the pistons are intermittently rotated in time relation to each other so that during their rotary movements, first one and then the other will be given a partial rotation which will result in a relative movement of the vanes with relation to each other, so that during the rotation of the pistons, the vanes will be moved toward and from each other in a circular path.

The object of the invention is to provide a simple form of connecting mechanism between the pistons whereby the intermittent and step-by-step partial rotary movements thereof shall be automatically controlled and whereby the intermittent rotations of the pistons through the interconnecting controlling mechanism will result in imparting to a driven shaft a continuous rotary movement.

A further object is to provide an interconnecting controlling mechanism for the intermittent rotary pistons which shall be entirely inclosed in the inclosing casing, and not exposed and liable to be disarranged by accidental shocks or blows.

A further object of the invention is to provide a rotary motor with intermittent rotating pistons and with interconnecting controlling mechanism so constructed and arranged that it may be embodied in an internal combustion engine or a rotary steam engine, and which is adapted also to be used as a pump, or a gas or water meter.

To the above ends my invention consists of a rotary engine comprising a pair of rotary pistons provided about their periperies with vanes, the vanes of one piston extending across the periphery of the other piston, and with interconnecting mechanism comprising a double crank shaft between the pistons, and with means for rotating said double crank shaft.

It further consists of the devices and combinations of devices which will be hereinafter set forth and claimed.

Reference is to be had to the accompanying drawings, constituting a part of this specification, in which similar characters of reference denote corresponding parts in all the views and in which—

Figure 2:
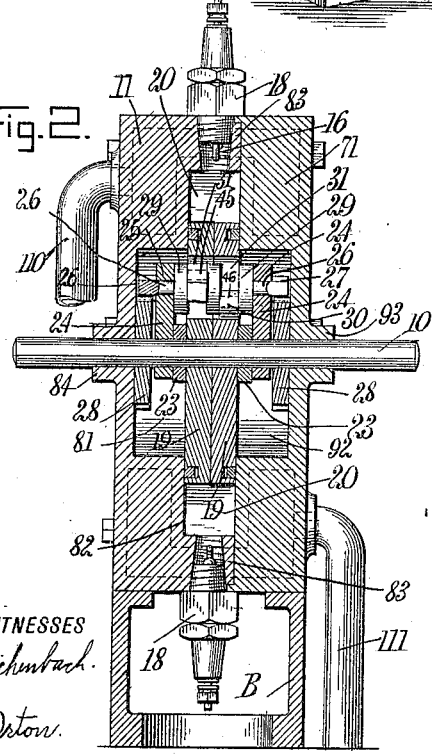
Figure 3:
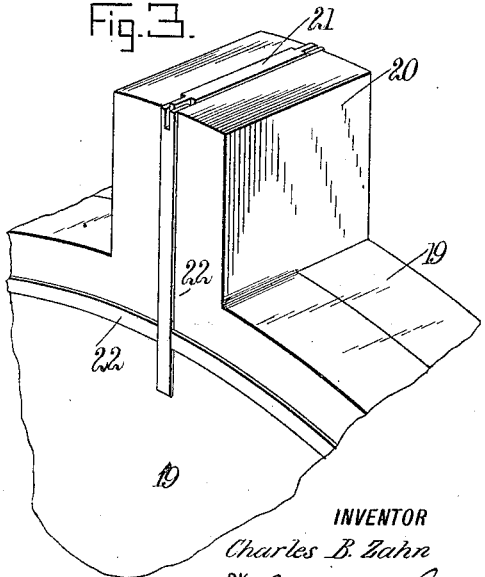
Figure 4:
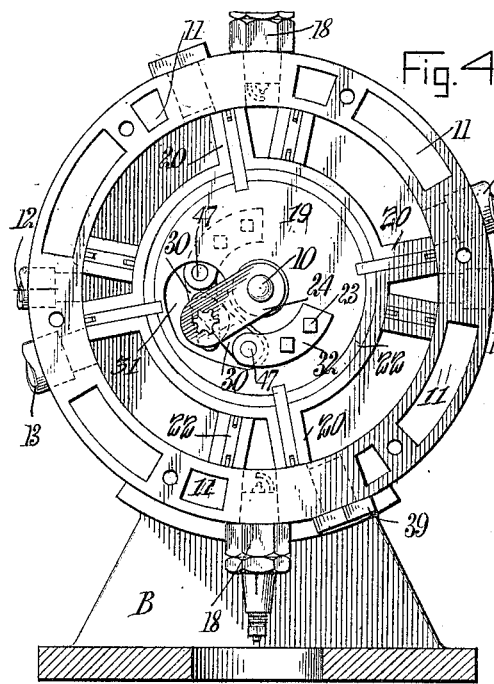
Figure 5:
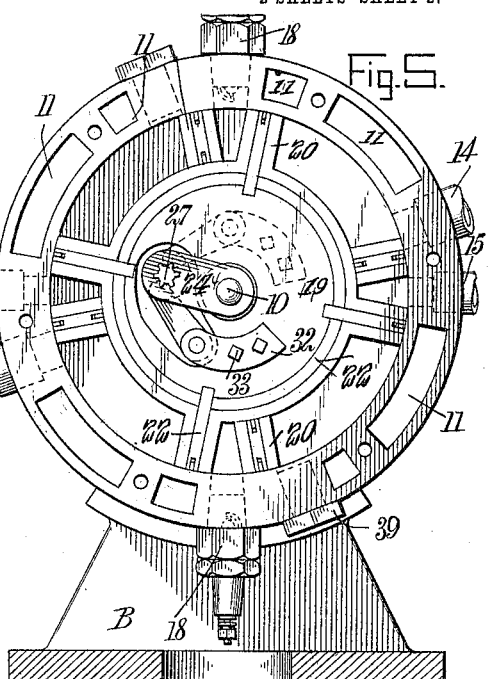
Figure 6:
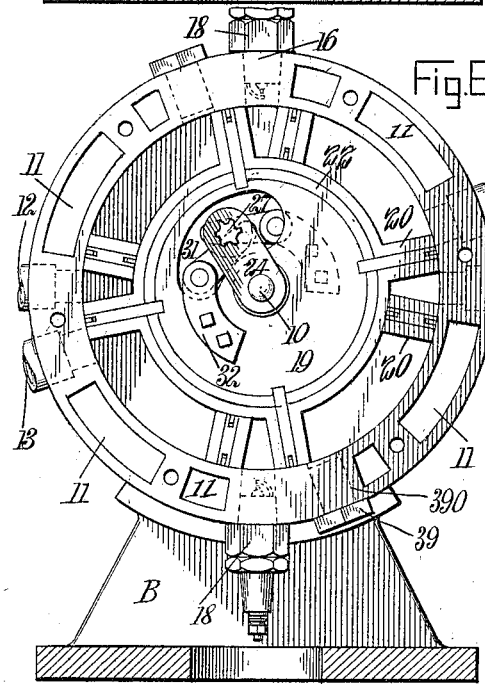
Figure 7:
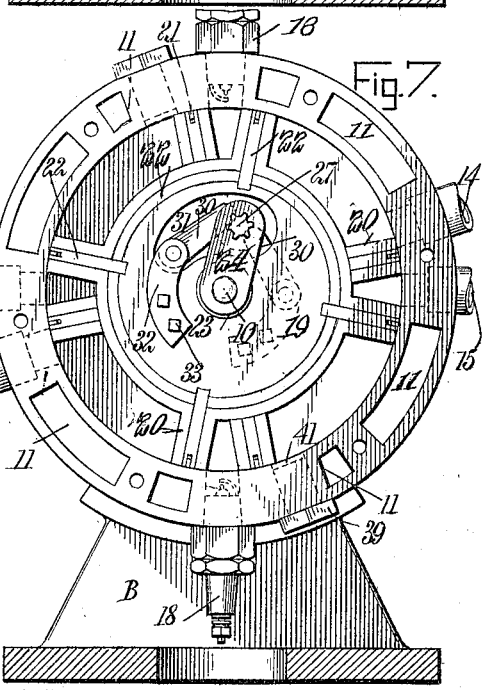

Figure 1 is a perspective view showing my invention embodied in an internal combustion engine; Fig. 2 is a vertical sectional view taken centrally through the engine shown in Fig. 1, on a line passing through its axis; Fig. 3 is an enlarged perspective view of a relatively small portion of the pistons showing one of the vanes; Fig. 4 is a side elevation of the engine shown in Fig. 1 with one wall of the casing removed showing the position of the parts at one point in the cycle of movement; Fig. 5 is a view similar to Fig. 4, but showing the position of the parts in the next succeeding point in the cycle of movement; and Figs. 6 and 7 are similar to Figs. 4 and 5, but showing a position of the parts in the next two successive points in the cycle of movement.

In the embodiment of the invention illustrated in the drawings, there is provided a casing A mounted upon and supported by a suitable base B, which latter may be of any suitable form and construction, adapted to support the casing A. The casing A is preferably cylindrical in form and comprises a cylindrical section 8 and a cylindrical head 9, these parts being held together in the position shown in Fig. 1 to form a gas and fluid-tight union, as by means of the bolts 91.

As shown clearly in Fig. 2, of the drawing, the cylindrical section 8 is provided upon its inner surface with a cylindrical recess 81 and a radial enlargement of the recess 82, which is bounded by a shoulder or flange 83, and the head or cover 9 is provided upon its inner face with a cylindrical recess 92 which, when the head or cover 9 is secured in place, forms with the cylindrical recess 81 a cylindrical chamber located centrally of the casing.

When my invention is embodied in an internal combustion engine, the casing formed by the sections 8 and 9 will be provided with a water jacket formed by chambers 11 formed in the sections 8 and 9, and which communicate with each other by suitable mating openings formed in the abutting surfaces of the flange 83, and the inner face of the head 9, so as to permit the free circulation of water within the water jacket through the chambers 11. A pipe 110 communicates with the chambers 11 to supply water thereto, and a pipe 111 conducts the water therefrom.

The sections 8 and 9 are provided at their axes with suitable bearings 84 and 93, in which is mounted to rotate, a shaft 10, said shaft in the present embodiment of the invention being driven by the rotary pistons and interconnecting mechanism, all as will be hereinafter described.

The pistons 19 are in the form of circular disks provided at their peripheries with vanes 20, each of the pistons in the illustrated embodiment of the invention being provided with four vanes, the vanes being substantially double the width of the pistons, and projecting laterally to one side, so that when the pistons are mounted upon the shaft 10 (as shown in Fig. 2) the vanes 20 of one piston will overlap or extend across the periphery of the other piston.

As shown clearly in Fig. 2 of the drawing, the diameter of the pistons is somewhat greater than the cylindrical chamber formed by the recesses 81 and 92, so that the peripheries of the pistons, as well as the vanes 20 are received within the circular radial enlargement 82 of the cylindrical chamber, they being intended to fit closely within the walls of the radial enlargement of the chamber, and in order to insure a substantially gas and fluid-tight fitting of the pistons and vanes within said radial enlargement of the chamber, the outer faces of the pistons will be provided with circular grooves to receive a suitable packing strip 22 (see Fig. 3 of the drawing), and also the vanes 20 will be provided with radial grooves along their side faces and a transverse groove along the face of the outer ends to receive packing strips 22 and 21 respectively.

The vanes 20 may be of any desired shape or configuration suitable to the purpose for which they are intended, but in the illustrated embodiment wherein the invention is embodied in an internal combustion engine, the vanes 20 project radially from the peripheries of the pistons, and each of the pistons is provided with four vanes, and when assembled as shown, the vanes on one piston will be alternately arranged with relation to the vanes on the other piston.

When embodied in an internal combustion engine, the explosive pulsations communicated to the vanes act to impart to the pistons a rotary movement, and inasmuch as it is desired that this rotary movement shall impart a rotary movement to the shaft 10, suitable interconnecting mechanism is provided between the pistons and said shaft whereby the intermittent and alternate rotary movements of the pistons will communicate a continuous rotation to the shaft. To secure this result, the shaft 10 is provided within the chamber formed by the cylindrical recesses 81 and 92 with washers 23 which abut closely against the pistons 19 and outside of the washers 23 radially extending arms 24 are fixedly secured as by means of suitable splines to the shaft 10 and extend therefrom radially in the same direction. At their ends, the arms 24 carry bearings 25 in which are loosely mounted the trunnions 26 of a double crank shaft formed by end disks 29 and an intermediate disk 34 connected by the eccentrically arranged crank pins 45 and 46.

The double crank shaft passes through mating openings 31 formed in the pistons 19, all as clearly shown in Fig. 2 of the drawing. The trunnions 26 of the double crank shaft are provided at their outer ends with pinions 27 fixedly secured thereto, which pinions mesh with circular racks 28 fixedly secured to the inner faces of the end walls of the cylindrical chamber 81—92.

By the foregoing arrangement a rotation of the pistons 19 causes the pinions 27 to be carried about the fixed racks 28, and thus causes a planetary movement of the pinions 27 resulting in a rotary movement of the double crank shaft, all as will be clear from an inspection of the drawing. The connection between the pistons 19 and the shaft 10 is effected through the double crank shaft, and the radial arms 24 by means of links 30, there being two of such links, and they are each pivotally connected at one end to the crank pins 45 and 46 respectively, and their opposite ends pivotally connected at 47 to brackets 32 secured one to each of the pistons as by means of bolts 33.

As shown in Figs. 4 to 7 of the drawings, the links 30 extend in opposite directions, and as the crank shaft is rotated, the ends of the links pivoted thereto will be moved in a circular direction about a line passing through the axes of the trunnions of the crank shaft, and radially toward and from the axes of the pistons.

From the foregoing it will be seen that a movement of the pistons will cause a rotation of the crank shaft and through the links 30 the extent of rotary movement of the pistons will be limited so that first one piston will move to the extent permitted by its link connection and come to a rest, and thereafter the other piston will move in the same direction to the limit of movement permitted by its link connection and come to a rest, and this action will be repeated through a complete cycle of movement, first one piston moving, and then the other, and by reason of the link connection, the piston at any time at rest will be locked in that position against a retractive movement for a purpose to be hereinafter described.

In the embodiment of the invention shown in the drawing a rotary engine of the internal combustion type is produced in which the pistons are propelled by explosive pulsations delivered at diametrically opposite points of their peripheries, and therefore, means are provided whereby vaporized fuel is delivered to the peripheries of the pistons simultaneously at diametrically opposite points, and also means are provided whereby the exploded gases are discharged simultaneously at two diametrically opposite points.

As shown in the drawing, the cylindrical casing is provided at diametrically opposite points with spark plugs or ignition devices 18 which may be of any suitable or desired construction and which in and of themselves form no part of my invention. At two diametrically opposite points the cylindrical casing is provided with inlet ports 12 and 15 by means of which the explosive vapor or gas is admitted to the peripheries of the pistons, and in order to permit the discharge of the exploded gases, the casing is provided at two diametrically opposite points with exhaust ports 13 and 14, the ports 13 and 14 being arranged relatively close to the inlet ports 12 and 15 so that immediately after the exploded gases have been discharged from a chamber formed by the space between an adjacent pair of vanes, a charge of explosive vapor may be drawn into said chamber.

The operation of the apparatus is as follows: Looking at Fig. 4 of the drawing, it will be assumed that an explosion takes place at the points where the spark plugs 18 are located, the direction of rotation being clockwise. The piston which is underneath in that figure will move to the limit permitted by its link connection, the vane at the top moving toward the right, and the vane at the bottom moving toward the left, the uppermost piston remaining fixed, and by means of its link connection prevented from having a retractive movement, thus the vanes at the top and bottom on that piston act as abutments to receive the impact of the exploding gases. The movement of the under piston causes a discharge of the previously exploded charge through the exhaust ports 13 and 14 and simultaneously therewith the other pair of vanes which at the time of the explosion are located in advance of the intake ports 12 and 15, draw into the space between a pair of vanes, a fresh charge which enters the space between a pair of vanes at normal pressure. This movement brings the parts to the position shown in Fig. 5 where the vanes on the uppermost piston are now at the opposite side of the ignition devices and the intake ports respectively, the vanes of the under piston approaching the ignition devices. Thus the charges which have been taken in are compressed at the points intermediate the ignition devices and the intake ports, so that another explosion will bring into position the compressed gases, and the operation will proceed as described, the operation being explosions at diametrically opposite points and simultaneously therewith the discharge of the previously exploded gases, the intake of fresh charges, and the compression of previously taken charges, all in consecutive time relation as the pistons partake of their intermittent rotative pulsations. It is therefore seen that because of the relative movement of the vanes toward and from each other during their intermittent rotary movements there will be in the engine as illustrated in the drawing, sixteen explosions and sixteen discharges of exploded gases, and sixteen intakings of explosive gases, and sixteen compressions of charges during each cycle of movement of the engine.

While I have in the illustrated embodiment of my invention shown it as incorporated in an engine of the internal combustion type, it is applicable to a rotary steam engine; in fact, the engine as illustrated could with slight changes be changed into a steam engine. This could be accomplished by providing the casing with auxiliary ports 390 which when the engine was used as a gas engine would be closed by the removable plugs 39.

In adapting the invention to a steam engine, the ignition plugs 18 and the plugs 39 would be removed thus providing additional intake and exhaust valves to coöperate with the intake and exhaust valves 12—13—14 and 15. It is also to be observed that the invention is applicable for use in a pump in which case the pistons might be rotated from the shaft 10 or one or more pair of intake and exhaust ports could be employed to admit fluid under pressure to the vanes of the pistons whereby the pistons would be rotated and the liquid to be pumped would be admitted to other intake ports and discharged from the complementary discharge ports. It is also to be noted that the invention is capable of being used in rotary meters for measuring various fluids, the fluid to be measured being passed through the intakes and causing a rotation of the pistons and discharged through the outlet ports, it being understood that in such form of the invention, the rotation of the pistons would operate a suitable indicating pointer.

Having thus described my invention, I claim as new and desire to secure by Letters Patent:

1. In combination, a pair of rotary pistons, vanes projecting from the peripheries of said pistons, the vanes on one piston extending across the periphery of the other piston, a main shaft upon which said pistons are mounted, a double crank shaft passing through said pistons, supports for said crank shaft fixedly secured to the main shaft, links pivoted respectively at one end to the cranks of the crank shaft and at their other end to the pistons and extending in opposite directions, and means to rotate the crank shaft as the pistons rotate.

2. In combination, a casing, a cylindrical chamber therein, a pair of circular pistons arranged to rotate in said chamber, a plurality of vanes projecting from the peripheries of said pistons, the vanes on one piston extending across the periphery of the other piston and alternately arranged with relation to each other, means to impart to said pistons intermittent rotary movement in the same direction, and in alternate time relation to each other, a shaft passing through said pistons, arms fixedly secured to said shaft, a double crank shaft mounted in said arms, a pair of links each pivotally connected at one end to one of said pistons, and at their opposite end to one of the cranks of the double crank shaft, and means to rotate said double crank shaft as the pistons rotate.

3. In combination, a casing, a cylindrical chamber therein, a pair of circular pistons arranged to rotate in said chamber, a plurality of vanes projecting radially from the peripheries of said pistons, the vanes on one piston extending across the periphery of the other piston and alternately arranged with relation thereto, means to impart to said pistons intermittent rotary movement in the same direction and in alternate time relation to each other, a shaft passing through said pistons, arms fixedly secured to said shaft, a double crank shaft mounted in said arms, a pair of links each pivotally connected at one end to one of said pistons and at their opposite end to one of the cranks of the double crank shaft, and suitable gearing arranged to rotate said double crank shaft as the pistons rotate.

4. In combination, a casing, a cylindrical chamber therein, a pair of circular pistons arranged to rotate in said chamber, a plurality of vanes projecting radially from the peripheries of said pistons, the vanes on one piston extending across the periphery of the other piston and alternately arranged with relation thereto, means to impart to said pistons intermittent rotary movement in the same direction and in alternate time relation to each other, a shaft passing through said pistons, arms fixedly secured to said shaft, a double crank shaft mounted in said arms, a pair of links each pivotally connected at one end to one of said pistons, and at their opposite end to one of the cranks of the double crank shaft, a pinion mounted on said double crank shaft, and a fixed circular rack in mesh with said pinion.

5. In combination, a casing, a cylindrical chamber therein, a pair of circular pistons arranged to rotate in said chamber, a plurality of vanes projecting from the peripheries of said pistons, the vanes on one piston extending across the periphery of the other piston and alternately arranged with relation thereto, means to impart to said pistons intermittent rotary movement in the same direction and in alternate time relation to each other, a shaft passing through said pistons, arms fixedly secured to said shaft, a double crank shaft mounted in said arms, a pair of links each pivotally connected at one end to one of said pinions and at their opposite ends to the cranks of the double crank shaft, pinions fixed to the ends of the double crank shaft, and fixed circular racks engaging said pinions.

6. In combination, a casing, a cylindrical chamber therein, said chamber having a centrally arranged radial enlargement, a pair of circular pistons arranged to rotate in said chamber, and having a plurality of vanes projecting from the peripheries of said pistons, the vanes and the peripheral edges of the pistons entering and fitting the radial enlargement of the chamber, the vanes on one piston extending across the periphery of the other piston and alternately arranged with relation thereto, means to impart to said pistons intermittent rotary movements in the same direction and at alternate time relation to each other, a shaft mounted in bearings in the casing and passing through the axes of the pistons, arms fixedly secured to said shaft within the cylindrical chamber and extending radially therefrom in the same direction, and located upon opposite sides of the pistons, a double crank shaft mounted to rotate in said arms, a pair of links each pivotally connected at one end to one of said pistons and at their opposite ends to one of the cranks of the double crank shaft, and means within the chamber to rotate said double crank shaft as the piston rotates so as to rock said links.

7. In combination, a casing, a cylindrical chamber therein, said chamber having a centrally arranged radial enlargement, a pair of circular pistons arranged to rotate in said chamber, a plurality of vanes projecting from the peripheries of said pistons, the vanes and the peripheral edges of the pistons entering and fitting the radial enlargement of the chamber, the vanes on one piston extending across the periphery of the other piston, and alternately arranged with relation thereto, means to impart to said pistons intermittent rotary movements in the same direction and in alternate time relation to each other, a shaft mounted in bearings in said casing and passing through the axes of said pistons, arms fixedly secured to said shaft and projecting therefrom radially in the same direction and located upon opposite sides of said pistons, registering openings through said pistons, a double crank shaft mounted to rotate in said arms and passing through the openings in the pistons, a pair of links extending in opposite directions, one end of each of said links being pivotally mounted upon one of the cranks of the crank shaft and their opposite ends pivotally connected one to each of the pistons, pinions mounted upon the ends of the double crank shaft and fixed circular racks within the chamber engaged by said pinions.

8. In combination, a casing, a cylindrical chamber therein, a pair of circular pistons arranged to rotate in said chamber, a plurality of vanes projecting from the peripheries of said pistons, the vanes on one piston extending across the periphery of the other piston and alternately arranged with relation thereto, a shaft passing through said pistons, arms fixedly secured to said shaft, a double crank shaft mounted in said arms, a pair of links each pivotally connected at one end to one of said pistons and at their opposite ends to one of the cranks of the double crank shaft, means to rotate said double crank shaft as the pistons rotate, and inlet and exhaust ports opening through the casing in the path of movement of the vanes.

In testimony whereof I have signed my name to this specification in the presence of two subscribing witnesses.

CHARLES B. ZAHN.

Witnesses:
SELDEN E. MAY,
T. HART ANDERSON.

Copies of this patent may be obtained for five cents each, by addressing the "Commissioner of Patents, Washington, D. C."